(12) United States Patent
Shi et al.

(10) Patent No.: US 10,911,968 B2
(45) Date of Patent: Feb. 2, 2021

(54) METHOD FOR WIRELESS COMMUNICATION, TERMINAL, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/944,121

(22) Filed: Jul. 30, 2020

(65) Prior Publication Data

US 2020/0367081 A1 Nov. 19, 2020

Related U.S. Application Data

(63) Continuation of application No. PCT/CN2018/075691, filed on Feb. 7, 2018.

(51) Int. Cl.
*H04W 72/04* (2009.01)
*H04W 16/28* (2009.01)
(Continued)

(52) U.S. Cl.
CPC ............ *H04W 24/08* (2013.01); *H04W 24/10* (2013.01)

(58) Field of Classification Search
CPC .... H04B 7/0617; H04B 7/0695; H04B 7/088; H04B 17/318; H04B 7/0639;
(Continued)

(56) References Cited

U.S. PATENT DOCUMENTS

| 8,971,881 B2 | 3/2015 | Nimbalker |
|---|---|---|
| 9,380,635 B2 | 6/2016 | Chisu |

(Continued)

FOREIGN PATENT DOCUMENTS

| CN | 101257419 A | 9/2008 |
|---|---|---|
| CN | 101330716 A | 12/2008 |

(Continued)

OTHER PUBLICATIONS

International Search Report in the international application No. PCT/CN2018/075691, dated Oct. 9, 2018.
(Continued)

*Primary Examiner* — Sai Aung
(74) *Attorney, Agent, or Firm* — Perkins Coie LLP; Han-Wei (Harvey) Chen

(57) ABSTRACT

A method for wireless communication includes that: a terminal reports at a first protocol layer a first event to a second protocol layer; the first event indicates that quality of a signal in a first signal set is bad enough to satisfy a first condition; determines at the second protocol layer occurrence of a second event when a number of times that the first event has successively occurred exceeds a threshold; and sends a first message to a network device, the first message indicates a signal in the second signal set, of which signal quality is good enough to satisfy a third condition; occurrence of the first event includes occurrence of beam failure instance, the occurrence of the second event includes occurrence of beam failure, and the second event indicates that link quality corresponding to the signal in the first signal set is bad enough to satisfy a second condition.

20 Claims, 5 Drawing Sheets

(51) Int. Cl.
  *H04B 7/06* (2006.01)
  *H04B 7/0408* (2017.01)
  *H04W 24/08* (2009.01)
  *H04W 24/10* (2009.01)

(58) Field of Classification Search
  CPC .. H04B 7/0626; H04B 7/0417; H04B 7/0408;
       H04B 17/336; H04B 7/0632; H04B
       7/0404; H04B 7/0452; H04W 16/28;
       H04W 72/046; H04W 24/10; H04W
       74/0833; H04W 72/042; H04W 72/0413;
       H04W 72/0453; H04W 76/15; H04W
       64/003; H04W 72/02; H04W 80/02
  See application file for complete search history.

(56) References Cited

U.S. PATENT DOCUMENTS

| | | |
|---|---|---|
| 2013/0176854 A1 | 7/2013 | Chisu |
| 2013/0252606 A1 | 9/2013 | Nimbalker |
| 2017/0150444 A1 | 5/2017 | Li et al. |
| 2017/0207843 A1* | 7/2017 | Jung .................... H04B 7/0695 |
| 2017/0346539 A1* | 11/2017 | Islam .................... H04B 7/0695 |
| 2018/0206170 A1* | 7/2018 | Nagaraja ............... H04W 76/19 |
| 2018/0278467 A1* | 9/2018 | John Wilson ....... H04W 72/046 |
| 2019/0379503 A1* | 12/2019 | Kang .................... H04W 24/10 |
| 2020/0099437 A1* | 3/2020 | Harada ................. H04L 5/0053 |

FOREIGN PATENT DOCUMENTS

| | | |
|---|---|---|
| CN | 101494520 A | 7/2009 |
| CN | 104067654 A | 9/2014 |
| CN | 104303562 A | 1/2015 |
| WO | 2015192315 A1 | 12/2015 |

OTHER PUBLICATIONS

LG Electronics, Discussion on beam failure recovery, Discussion and Decision, 3GPP TSG RAN WG1 Meeting #91 R1-1719908, Nov. 27-Dec. 1, 2017 (Nov. 27-Dec. 1, 2017).

Ericsson, Remaining details of beam recovery, Discussion and Decision, 3GPP TSG-RAN WG1 #91 R1-1720737, Nov. 27-Dec. 1, 2017 (Nov. 27-Dec. 1, 2017).

Written Opinion of the International Search Authority in the international application No. PCT/CN2018/075691, dated Oct. 9, 2018.

* cited by examiner

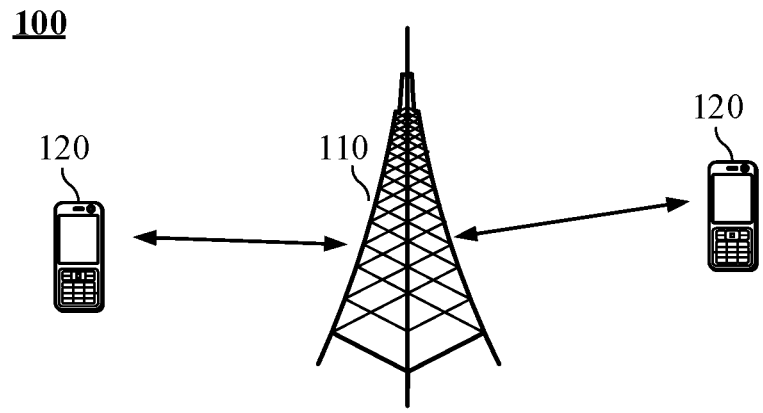

A terminal reports, at a first protocol layer, a first event to a second protocol layer, the first event being used to indicate that quality of a signal in a first signal set is bad enough to satisfy a first condition — 210

When the terminal determines based on an occurrence situation of the first event at the second protocol layer that a second event has occurred, the terminal stops at least one of the following at the first protocol layer: measuring the quality of the signal in the first signal set, determining occurrence of the first event, or reporting the first event to the second protocol layer; or, the terminal continues the at least one of the following at the first protocol layer: measuring the quality of the signal in the first signal set, determining the occurrence of the first event, or reporting the first event to the second protocol layer — 220

FIG. 2

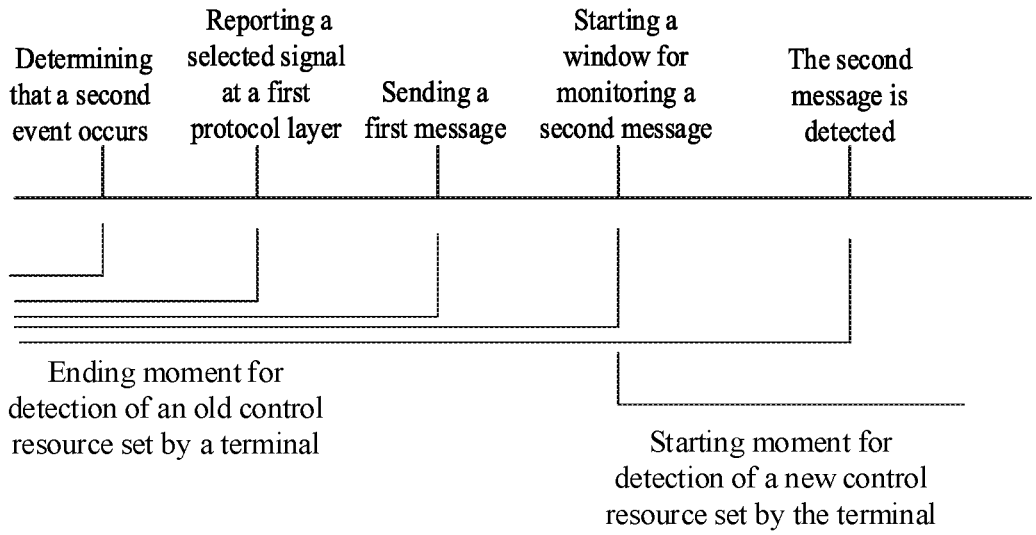

| A terminal measures a signal in a first signal set to determine occurrence of a first event, the first event being used to indicate that quality of the signal in the first signal set is bad enough to satisfy a first condition | 310 |

| When it is determined based on an occurrence situation of the first event that a second event has occurred, the terminal performs at least one of the following: keeping PDCCH detection in a first control resource set until a first moment arrives, or stopping PDCCH detection in the first control resource set after the first moment, the first control resource set being a resource set for PDCCH detection before the second event occurs and the second event being used to indicate that link quality corresponding to the signal in the first signal set is bad enough to satisfy a second condition | 320 |

A terminal measures a signal in a first signal set to determine occurence of a first event, the first event being used to indicate that quality of the signal in the first signal set is bad enough to satisfy a first condition — 410

When it is determined based on an occurrence situation of the first event that a second event has occurred, the terminal measures a signal in a second signal set, the second event being used to indicate that link quality corresponding to the signal in the first signal set is bad enough to satisfy a second condition — 420

At least one signal of which signal quality is good enough to meet a third condition in the second signal set is selected and reported to a network device — 430

FIG. 5

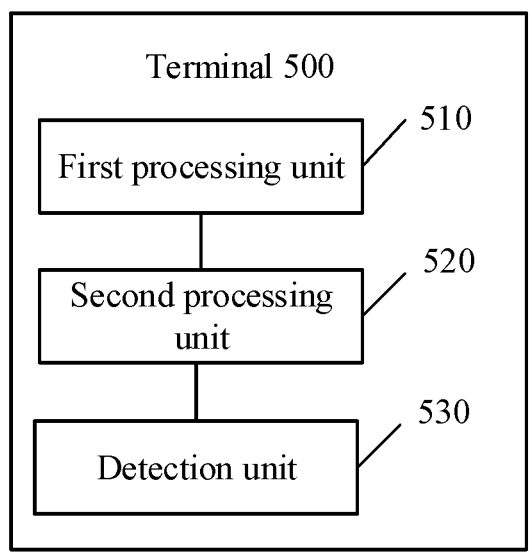

FIG. 6

METHOD FOR WIRELESS COMMUNICATION, TERMINAL, AND NON-TRANSITORY COMPUTER-READABLE STORAGE MEDIUM

CROSS-REFERENCE TO RELATED APPLICATION

This application is a U.S. continuation application of International Application No. PCT/CN 2018/075691, entitled "WIRELESS COMMUNICATION METHOD AND DEVICE", filed on Feb. 7, 2018, the disclosure of which is hereby incorporated by reference in its entirety.

TECHNICAL FIELD

The disclosure relates to the field of communications, and more particularly to a method for wireless communication and a device.

BACKGROUND

In researches on 5th-Generation (5G) mobile communication technologies, a beamforming technology is an important technology for improving coverage and spectrum efficiency. Beamforming refers to an antenna-array-based signal preprocessing technology and generates a directional beam by regulating a weight of a signal transmitted on each antenna array element.

A network device may transmit multiple signals using different beams, and a terminal device may measure received signals to determine whether a link for transmitting the signals is too bad to be available.

SUMMARY

The aspects of the disclosure provide a method for wireless communication, a terminal, and a non-transitory computer-readable storage medium.

According to a first aspect, a method for wireless communication is provided. The method for wireless communication includes that: a terminal reports, at a first protocol layer, a first event to a second protocol layer, the first event being used to indicate that quality of a signal in a first signal set is bad enough to satisfy a first condition; the terminal determines, at the second protocol layer, occurrence of a second event when a number of times that the first event has successively occurred exceeds a threshold; the terminal sends a first message to a network device, where the first message is used to indicate a signal in the second signal set, of which signal quality is good enough to satisfy a third condition; occurrence of the first event includes occurrence of beam failure instance, the occurrence of the second event includes occurrence of beam failure, and the second event is used to indicate that link quality corresponding to the signal in the first signal set is bad enough to satisfy a second condition.

According to a second aspect, a terminal is provided. The terminal includes:

a processor; and a memory storing instructions executable by the processor, the processor is configured to:

report, through a transceiver, at a first protocol layer, a first event to a second protocol layer, where the first event is used to indicate that quality of a signal in a first signal set is bad enough to satisfy a first condition;

determine, at the second protocol layer, occurrence of a second event when a number of times that the first event has successively occurred exceeds a threshold; and send, through the transceiver, a first message to a network device, where the first message is used to indicate a signal in the second signal set, of which signal quality is good enough to satisfy a third condition;

occurrence of the first event includes occurrence of beam failure instance, the occurrence of the second event includes occurrence of beam failure, and the second event is used to indicate that link quality corresponding to the signal in the first signal set is bad enough to satisfy a second condition.

According to a third aspect, a non-transitory computer-readable medium is provided. The computer-readable medium stores a program code configured to be executed by a terminal, the program code including instructions configured to execute the method of the first aspect.

BRIEF DESCRIPTION OF THE DRAWINGS

In order to describe the technical solutions of the embodiments of the disclosure more clearly, the drawings required to be used in descriptions about the embodiments or a related art will be simply introduced below. It is apparent that the drawings described below are only some embodiments of the disclosure. Other drawings may further be obtained by those of ordinary skill in the art according to these drawings without creative work.

FIG. 1 is a schematic diagram of a system for wireless communication according to an embodiment of the disclosure.

FIG. 2 is a schematic flowchart of a method for wireless communication according to an embodiment of the disclosure.

FIG. 3 illustrates a starting or ending moment for detection of a specific PDCCH according to an embodiment of the disclosure.

FIG. 4 is a schematic flowchart of a method for wireless communication according to an embodiment of the disclosure.

FIG. 5 is a schematic flowchart of a method for wireless communication according to an embodiment of the disclosure.

FIG. 6 is a schematic block diagram of a terminal according to an embodiment of the disclosure.

DETAILED DESCRIPTION

Figure 7:
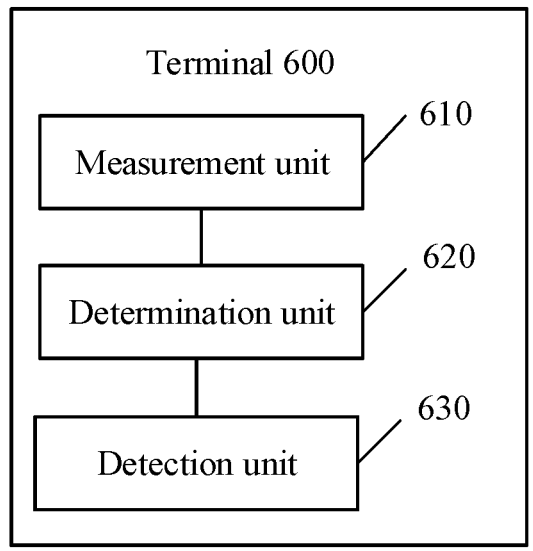
FIG. 7 is a schematic block diagram of a terminal according to an embodiment of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

In the related art, there is yet no solution for how to perform subsequent processing based on a determination result of received signals.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system (which may also be called a New Radio (NR) system).

FIG. 1 illustrates a system for wireless communication 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. In at least one alternative embodiment, the network device 110 may be a Base Transceiver Station (BTS) in the GSM or the CDMA system, may also be a NodeB (NB) in the WCDMA system, and may further be an Evolutional Node B (eNB or eNodeB) in the LTE system, or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 located within the coverage of the network device 110. The terminal device 120 may be mobile or fixed. In at least one alternative embodiment, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

In at least one alternative embodiment, Device to Device (D2D) communication may be implemented between the terminal devices 120.

In at least one alternative embodiment, the 5G system or network may also be called an NR system or network.

A network device and two terminal devices are exemplarily illustrated in FIG. 1. In at least one alternative embodiment, the wireless communication system 100 may include multiple network devices and another number of terminal devices may be included in coverage of each network device. There are no limits made thereto in the embodiments of the disclosure.

In at least one alternative embodiment, the wireless communication system 100 may further include other network entities such as a network controller and a mobility management entity. There are no limits made thereto in the embodiments of the disclosure.

It is to be understood that terms "system" and "network" in the disclosure may usually be exchanged in the disclosure.

In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 2 is a schematic flowchart of a method for wireless communication 200 according to an embodiment of the disclosure. The method 200 may optionally be applied, but not limited, to the system illustrated in FIG. 1. As illustrated in FIG. 2, the method 200 includes at least part of the following contents.

In 210, a terminal reports, at a first protocol player, a first event to a second protocol layer. Herein, the first event is used to indicate that quality of a signal in a first signal set is bad enough to satisfy a first condition.

In at least one alternative embodiment, the first protocol layer is a physical layer, and the second protocol layer is a higher layer and, for example, may be a Media Access Control (MAC) layer.

In at least one alternative embodiment, the signal in the first signal set may be a Channel State Information Reference Signal (CSI-RS), a Synchronous Signal (SS), or a Physical Broadcast Channel (PBCH).

In at least one alternative embodiment, the signals in the first signal set may be transmitted through different beams.

Here, the terminal may measure the signal in the first signal set and, when discovering a signal with relatively high signal quality, may notify an index of the signal to a network side, and the network side may transmit a downlink channel or a signal, for example, a PDCCH, to the terminal by use of a transmission beam on which the signal is transmitted.

In at least one alternative embodiment, each signal in the first signal set is quasi-colocated with at least one control resource set with respect to a space receiving parameter.

Specifically, the control resource set may be used to transmit the PDCCH, and thus the terminal may measure the signal in the first signal set to determine whether quality of the PDCCH, which is transmitted through the control resource set quasi-colocated with the signal with respect to the space receiving parameter, satisfies a threshold which is preset or configured by the network side.

In at least one alternative embodiment, the terminal may determine, at the first protocol layer, whether performance of a measurement result of the signal in the first signal set is higher than the threshold. When the performance of the measurement result is lower than the threshold, it is determined that the first event, i.e., a beam failure instance, occurs once, and information related to the first event is reported to the second protocol layer.

In at least one alternative embodiment, the terminal may report the first event to the second protocol layer when the terminal determines, at the first protocol layer, that the quality of each signal in the first signal set is bad enough to satisfy the first condition.

In at least one alternative embodiment, the terminal may periodically measure the signal in the first signal set.

In at least one alternative embodiment, the first event may be periodically reported, and if the first event is not reported once, the higher layer may know that the performance of the present corresponding measurement result is higher than the threshold and the first event does not occur.

In 220, when the terminal determines, at the second protocol layer, occurrence of a second event based on an occurrence situation of the first event, the terminal stops at least one of the following at the first protocol player: measuring the quality of the signal in the first signal set, determining occurrence of the first event, or reporting the first event to the second protocol layer; or, the terminal continues the at least one of the following at the first protocol player: measuring the quality of the signal in the first signal set, determining the occurrence of the first event, or reporting the first event to the second protocol layer.

Here, the second event is used to indicate that link quality corresponding to the signal in the first signal set is bad enough to satisfy a second condition.

Specifically, the terminal may determine whether the second event occurs based on at least one of the number of the received first events or a frequency of occurrence of the first event or the like. The second condition may be related to at least one of the number of the first events or the frequency of the occurrence of the first event. If the second condition is met, it is indicated that the link quality corresponding to the signal in the first signal set is relatively bad.

For example, if the terminal determines at the second protocol layer that the number of continuously received (continuously received within a specific time period) first events exceeds a constant value, it may be determined that the second event has occurred and it may also be determined that a beam failure has occurred.

In at least one alternative embodiment, after it is determined that the second event has occurred, the terminal stops at least one of the following at the first protocol layer: measuring the quality of the signal in the first signal set, determining the occurrence of the first event, or reporting the first event to the second protocol layer. Therefore, power consumption of the terminal may be improved.

Specifically, when the terminal determines at the second protocol layer that the second event has occurred, the terminal sends, at the second protocol layer, first indication information to the first protocol layer. The first indication information is used to indicate that the second event has occurred or instruct the terminal to stop the at least one of the following at the first protocol layer: measuring the quality of the signal in the first signal set, determining the occurrence of the first event, or reporting the first event to the second protocol layer. Responsive to the first indication information, the terminal stops the at least one of the following at the first protocol layer: measuring the quality of the signal in the first signal set, determining the occurrence of the first event, or reporting the first event to the second protocol layer.

In at least one alternative embodiment, after it is determined that the second event has occurred, the terminal continues the at least one of the following at the first protocol layer: measuring the quality of the signal in the first signal set, determining the occurrence of the first event, or reporting the first event to the second protocol layer, so as to determine whether the quality of the signal in the first signal set gets high, thereby improving beam failure-recovery performance.

The terminal may send, at the second protocol layer, indication information to the first protocol layer to instruct the terminal to continue at least one of the following at the first protocol layer: measuring the quality of the signal in the first signal set, determining the occurrence of the first event, or reporting the first event to the second protocol layer.

Or, the terminal may not send, at the second protocol layer, the indication information to the first protocol layer, the indication information instructing the terminal to continue the at least one of the following at the first protocol layer: measuring the quality of the signal in the first signal set, determining the occurrence of the first event, or reporting the first event to the second protocol layer, and the terminal may directly continue the at least one of the following at the first protocol layer: measuring the quality of the signal in the first signal set, determining the occurrence of the first event, or reporting the first event to the second protocol layer.

In at least one alternative embodiment, when it is determined that the second event has occurred, the terminal sends, at the second protocol layer, second indication information to the first protocol layer. The second indication information is used to instruct the terminal to perform at least one of the following operations: measuring a signal in a second signal set, or reporting a signal in the second signal set, of which signal quality is good enough to satisfy a third condition, or reporting a corresponding measurement result.

In at least one alternative embodiment, the signal in the second signal set may be a CSI-RS, an SS or a PBCH.

In at least one alternative embodiment, the signals in the second signal set may be transmitted through different beams.

Here, the terminal may measure the signal in the second signal set and, when discovering a signal with relatively high signal quality, may notify an index of the signal to the network side, and the network side may transmit a downlink channel or a signal, for example, a PDCCH, to the terminal by use of a transmission beam on which the signal is transmitted.

In at least one alternative embodiment, each signal in the second signal set is quasi-colocated with at least one control resource set with respect to a space receiving parameter.

Specifically, the control resource set may be used to transmit the PDCCH and thus the terminal may measure the signal in the second signal set to determine whether quality of the PDCCH, which is transmitted through the control resource set quasi-colocated with the signal with respect to the space receiving parameter, satisfies the threshold which is preset or configured by the network side.

In at least one alternative embodiment, responsive to the second indication information, the terminal performs the at least one of the following operations at the first protocol layer: measuring the signal in the second signal set, or reporting the signal in the second signal set, of which the signal quality is good enough to satisfy the third condition, or reporting a corresponding measurement result.

Specifically, the terminal discovers, at the physical layer, one or more new signals, Layer 1 (L1)-Reference Signal Receiving Power (RSRP) corresponding to each of the one or more new signals being greater than a threshold, the terminal sends identifiers and L1-RSRP measurement results of these signals to the higher layer, then the higher layer selects one of these signals as a target new signal according to reporting of the physical layer.

In at least one alternative embodiment, after it is determined that the second event has occurred, the terminal may start a timer and execute a link reconfiguration procedure during a duration of the timer.

Here, the link reconfiguration procedure may include at least one of:

a signal of which signal quality is good enough to satisfy the third condition is selected from the second signal set;

a first message is sent to the network side; here, the first message is used to indicate the selected signal and the first message may be called a beam failure request; specifically, the terminal initiates transmission by use of a Physical Random Access Channel (PRACH) corresponding to the selected signal or reports the new selected signal through a Physical Uplink Control Channel (PUCCH); or, a second message sent by the network side responsive to the first message is monitored.

In at least one alternative embodiment, when the terminal continues reporting, at the first protocol layer, the first event to the second protocol layer, the terminal determines, at the second protocol layer, whether the link quality corresponding to the signal in the first signal set is good enough to satisfy a fourth condition according to a situation of the first event that is continued to be reported.

In at least one alternative embodiment, the fourth condition includes at least one of the following conditions:

a number of times that the first event occurs within each of K time ranges is less than or equal to a first value, the second value being a number greater than or equal to 0;

a number of times that the second event occurs within the each of the K time ranges is less than or equal to a second value, the second value being a number greater than or equal to 0;

a number of times that the second event occurs within the K time ranges is less than or equal to a third value, the third value being a number greater than or equal to 0;

a ratio of the number of times that the first event occurs to a number of times that the first event does not occur within each of the K time ranges is less than or equal to a fourth value, the fourth value being a number greater than or equal to 0; or, a ratio of the number of times that the first event does not occur to the number of times that the first event occurs within the each of the K time ranges is greater than or equal to a fifth value, the fifth value being a number greater than or equal to 0.

K may be an integer greater than or equal to 1. In at least one alternative embodiment, when K is greater than or equal to 2, the K time ranges may be continuous time ranges.

It is to be understood that, in the embodiment of the disclosure, being greater than or equal to may be understood as the following three conditions: being greater than, being equal to, and being more than or equal to. Being less than or equal to may be understood as the following three conditions: being less than, being equal to, and being less than or equal to.

Descriptions will be made below in combination with some examples.

At first, there is made such a hypothesis that q0 is a signal set including one or more signals (which may be CSI-RSs and may also be SS/PBCH blocks), and a terminal may measure quality of the signal in the signal set to judge whether a beam failure instance may occur (here, a judgment threshold may be a hypothetical Block Error Ratio (BLER)). If performance corresponding to all the signals in q0 is lower than the threshold, one beam failure instance is determined.

The terminal measures, at a lower layer, link quality corresponding to the signal in q0, and then notifies a higher layer when the link quality is lower than the corresponding threshold. If the higher layer determines according to a notification of the lower layer that a beam failure has occurred (for example, N notifications each of which indicates that the link quality is lower than the corresponding threshold are continuously received), the higher layer continues a subsequent flow.

A timer for controlling a beam failure recovery procedure (which may also be called a link reconfiguration procedure) is started.

The lower layer is notified to report one or more signals satisfying the threshold in q1.

A beam failure request is sent to the network side.

A response fed back by the network side is detected in a specified window.

Meanwhile, the lower layer continues measuring and reporting the signal in q0, the higher layer continues making a judgment according to reported notification information, and if it is judged that a present link reenters a relatively good state, the terminal cancels the flow to be continued.

For how to judge that the present link reenters the relatively good state, some examples will be presented below.

Example 1

After the terminal judges that the beam failure has occurred (namely judging that the present link quality is bad), the terminal works according to a beam failure judgment flow to make X judgments in occurrence of the beam failure in a time range, and if X is less than or equal to a certain threshold (the threshold may be preset in the terminal or configured by the network), the terminal judges that the present link reenters the relatively good state.

The time range may be implemented by use of a timer and may also be implemented in other manners, and the time range may be preset in the terminal or configured by the network.

Example 2

There is only one time range in Example 1. In Example 2, based on Example 1, if X is less than or equal to a certain threshold in each of K continuous time ranges, the terminal judges that the present link reenters the relatively good state.

Example 3

After the terminal judges that the beam failure has occurred (namely judging that the present link quality is bad), according to that the total number X of received beam failure instances is less than or equal to a certain threshold (the threshold may be specified in a protocol or configured by the network) in a time range, the UE judges that the present link reenters the relatively good state. The threshold may be 0.

The time range may be implemented by use of a timer and may also be implemented in other manners, and the time range may be preset in the terminal or configured by the network.

Example 4

There is only one time range in Example 3. In Example 4, based on Example 3, if X is less than or equal to a certain threshold in each of K continuous time ranges, the UE judges that the present link reenters the relatively good state.

Example 5

After the terminal judges that the beam failure has occurred (namely judging that the present link quality is bad), according to that a ratio of the total number of the received beam failure instances to a number of beam failure instances that do not occur is less than or less than or equal to a certain threshold (the threshold may be preset in the terminal or configured by the network) in a time range, the terminal judges that the present link reenters the relatively good state. According to that a ratio of the total number of the received beam failure instances that do not occur to the number of the beam failure instances that occur is greater than or equal to a certain threshold (the threshold may be preset in the terminal or configured by the network) in a time range, the terminal judges that the present link reenters the relatively good state.

The time range may be implemented by use of a timer and may also be implemented in other manners, and the time range may be preset in the terminal or configured by the network.

Example 6

There is only one time range in Example 5. In Example 6, based on Example 5, if the ratios satisfy corresponding conditions in each of K continuous time ranges, the terminal judges that the present link reenters the relatively good state.

Example 7

After the UE judges that the beam failure has occurred (namely judging that the present link quality is bad), whether the beam failure occurs is judged according to reporting of the lower layer in a time range, and if no beam failure occurs in each of the K continuous time ranges, the UE judges that the present link reenters the relatively good state. K may be preset in the terminal or configured by the network. Each time range may be implemented by use of a timer, and the time range may be preset in the terminal or configured by the network.

In at least one alternative embodiment, when the terminal determines at the second protocol layer that the link quality corresponding to the signal in the first signal set is not good enough to satisfy the fourth condition, the terminal continues at least one of the following operations: executing a link reconfiguration procedure triggered by the second event, or incrementing a timer corresponding to the link reconfiguration procedure.

In at least one alternative embodiment, when the terminal determines at the second protocol layer that the link quality corresponding to the signal in the first signal set is good enough to satisfy the fourth condition, the terminal performs at least one of the following operations: aborting the link reconfiguration procedure triggered by the second event, or stopping the timer corresponding to the link reconfiguration procedure.

In at least one alternative embodiment, when the terminal determines at the second protocol layer that the link quality corresponding to the signal in the first signal set is good enough to satisfy the fourth condition, the terminal continues PDCCH detection in a first control resource set. The first control resource set is a resource set for PDCCH detection before the second event occurs.

The operation that the terminal continues PDCCH detection in the first control resource set when it is determined that the link quality corresponding to the signal in the first signal set is good enough to satisfy the fourth condition means that the terminal may already stop PDCCH detection in the first control resource set or keep PDCCH detection in the first control resource set before.

In the first control resource set, the network side transmits a PDCCH by use of a transmission beam corresponding to a signal, reported by the terminal, in the first signal set.

In at least one alternative embodiment, the terminal may perform at least one of the following operations: keeping PDCCH detection in the first control resource set until a first moment arrives; or, stopping the PDCCH detection in the first control resource set after the first moment.

The first control resource set is a resource set for PDCCH detection before the second event occurs.

In at least one alternative embodiment, as illustrated in FIG. 3, the first moment may be:

a moment at which the occurrence of the second event is determined;

or, a moment at which the first indication information is sent from the second protocol layer to the first protocol layer;

or, a moment at which a signal is reported from the first protocol layer to the second protocol layer, the signal being one in a second signal set, of which signal quality is good enough to satisfy the third condition;

or, a moment at which the first message is sent to the network side, the first message being used to indicate at least one selected signal;

or, a moment at which the second message sent by the network side responsive to the first message is started to be monitored;

or, a moment at which the second message is received;

or, a moment at which configuration information for configuring a third control resource set is received from the network side. The third control resource set may be a control resource set configured for a new signal reported by a terminal In at least one alternative embodiment, when the first moment is the moment at which the second message is started to be monitored, or the moment at which the second message is received, or the moment at which the configuration information for configuring the third control resource set is received, the method further includes the following operation.

In a case that detection in the first control resource set conflicts with detection in a second control resource set, the terminal performs PDCCH detection by preferential use of the second control resource set, the second control resource set being exclusively dedicated to detection of the second message.

In at least one alternative embodiment, the detection in the first control resource set conflicts with the detection in the second control resource set means that the terminal is required to simultaneously detect the two resource sets. Because of a processing capability of the terminal or different directions of receiving beams, the terminal may not simultaneously detect the two resource sets.

In at least one alternative embodiment, when the terminal continues reporting, at the first protocol layer, the first event to the second protocol layer, the terminal stops reporting, at the first protocol layer, the first event to the second protocol layer from or after a second moment.

In at least one alternative embodiment, the second moment may be:

the moment at which the signal is reported from the first protocol layer to the second protocol layer, the signal being one in a second signal set, of which signal quality is good enough to satisfy the third condition;

or, the moment at which the first message is sent to the network side, the first message being used to indicate the selected signal;

or, the moment at which the second message sent by the network side responsive to the first message is started to be monitored (as illustrated in FIG. 3);

or, the moment at which the second message is received;

or, a moment at which at least one of the first indication information, the second indication information, or third indication information sent at the second protocol layer is received at the first protocol layer.

The first indication information is used to indicate that the second event has occurred or instruct the terminal to stop at least one of the following operations: measuring the quality of the signal in the first signal set, determining the occurrence of the first event, or reporting the first event to the second protocol layer. The second indication information is used to instruct the terminal to perform at least one of the following operations: measuring the signal in the second signal set, reporting the signal in the second signal set, of which the signal quality is good enough to satisfy the third condition; or reporting the corresponding measurement result.

In order to conveniently understand the disclosure, descriptions will be made below in combination with some examples.

At first, there is made such a hypothesis that q0 is a set including one or more signals (which may be CSI-RSs and may also be SS/PBCH blocks), and the terminal may measure quality of the signal in the signal set to judge whether a beam failure instance may occur (here, a judgment threshold is a hypothetical BLER). If performance corresponding to all the signals in q0 is worse than the threshold, it is determined that a beam failure instance occurs.

q1 is a set including one or more signals (which may be CSI-RSs and may also be SS/PBCH blocks), and the terminal may measure corresponding quality to determine whether link quality corresponding to the signal is higher than a threshold to accordingly determine a possible new beam candidate set (a judgment threshold is L1-Reference Signal Receiving Power (RSRP)).

Example 1

The UE measures link quality corresponding to the signal in q0, and if the link quality is lower than the corresponding threshold, the higher layer is notified. If the higher layer determines according to a notification of the lower layer that a beam failure occurs (for example, N notifications each of which indicates that the link quality is lower than the corresponding threshold are continuously received), the UE may optionally execute the following subsequent operations.

The UE stops measuring and judging a link corresponding to the signal in q0.

The UE stops notifying the higher layer about that the link quality is lower than the corresponding threshold at the lower layer.

The UE starts measuring the signal in q1.

The UE reports information, that satisfies the threshold, of one or more signals in q1 at a later moment.

Embodiment 2

The UE measures the link quality corresponding to the signal in q0, and if the link quality is lower than the corresponding threshold, the higher layer is notified. If the higher layer determines according to the notification of the lower layer that a beam failure occurs (for example, N notifications each of which indicates that the link quality is lower than the corresponding threshold are continuously received), the higher layer continues a subsequent flow.

A timer for controlling a beam failure recovery procedure is started.

The lower layer is notified to report one or more signals satisfying the threshold in q1.

A beam failure request is sent.

A response fed back by the network side is detected in a specified window.

Meanwhile, the lower layer continues measuring and reporting in q0, the higher layer continues making a judgment according to reported notification information, and if it is judged that no beam failure occurs at present, the UE cancels the flow to be continued.

Accordingly, in the embodiment of the disclosure, when the terminal determines, at the second protocol layer, occurrence of the second event based on the occurrence situation of the first event, the terminal stops at least one of the following operations at the first protocol layer: measuring the quality of the signal in the first signal set, determining the occurrence of the first event, or reporting the first event to the second protocol layer, so that the power consumption of the terminal may be reduced; and the terminal continues the at least one of the following operations at the first layer: measuring the quality of the signal in the first signal set, determining the occurrence of the first event, or reporting the first event to the second protocol layer, so that the beam failure recovery performance may be improved.

FIG. 4 is a schematic flowchart of a method for wireless communication 300 according to an embodiment of the disclosure. The method 300 includes at least part of contents in the following contents.

In 310, a terminal measures a signal in a first signal set to determine occurrence of a first event. Herein, the first event is used to indicate that quality of the signal in the first signal set is bad enough to satisfy a first condition.

In 320, when occurrence of a second event is determined based on an occurrence situation of the first event, the terminal performs at least one of the following operations: keeping PDCCH detection in a first control resource set until a first moment arrives, or stopping the PDCCH detection in the first control resource set after the first moment. The first control resource set is a resource set for PDCCH detection before the second event occurs. The second event is used to indicate that link quality corresponding to the signal in the first signal set is bad enough to satisfy a second condition.

Accordingly, in the embodiment of the disclosure, when the occurrence of the second event is determined based on the occurrence situation of the first event, the terminal performs the at least one of the following operations: keeping PDCCH detection in the first control resource set until the first moment arrives, or stopping PDCCH detection in the first control resource set after the first moment, so that power consumption of the terminal may be reduced while avoiding missing detection of a PDCCH as much as possible.

In at least one alternative embodiment, the first moment may be:

a moment at which the occurrence of the second event is determined;

or, a moment at which a signal is reported to a second protocol layer from a first protocol layer, the signal being one in a second signal set, of which signal quality is good enough to satisfy a third condition;

or, a moment at which a first message is sent to a network side, the first message being used to indicate at least one selected signal;

or, a moment at which a second message sent by the network side responsive to the first message is started to be monitored;

or, a moment at which the second message is received;

or, a moment at which configuration information for configuring a third control resource set is received from the network side.

In at least one alternative embodiment, when the first moment is the moment at which the second message is started to be monitored, or the moment at which the second message is received, or the moment at which the configuration information is received, the method further includes the following operation.

In a case that detection in the first control resource set conflicts with detection in a second control resource set, the terminal performs PDCCH detection by preferential use of the second control resource set, the second control resource set being exclusively dedicated to detection of the second message.

In at least one alternative embodiment, each signal in the first signal set corresponds to a respective one of one or more transmission beams; and each signal in the second signal set corresponds to a respective one of one or more transmission beams.

In at least one alternative embodiment, each signal in the first signal set is quasi-colocated with at least one control resource set with respect to a space receiving parameter.

In at least one alternative embodiment, the second event is used to indicate that a number of times that the first event has successively occurred exceeds a first value.

It is to be understood that specific implementation of the method 300 may refer to descriptions about the method 200 and, for simplicity, will not be elaborated herein.

FIG. 5 is a schematic flowchart of a method for wireless communication 400 according to an embodiment of the disclosure. The method 400 includes at least part of contents in the following contents.

In 410, a terminal measures a signal in a first signal set to determine occurrence of a first event. The first event is used to indicate that quality of the signal in the first signal set is bad enough to satisfy a first condition.

In 420, when occurrence of a second event is determined based on an occurrence situation of the first event, the terminal measures a signal in a second signal set. The second event is used to indicate that link quality corresponding to the signal in the first signal set is bad enough to satisfy a second condition.

In 430, at least one signal of which signal quality is good enough to satisfy a third condition in the second signal set is selected and reported to a network device.

In at least one alternative embodiment, each signal in the first signal set corresponds to a respective one of one or more transmission beams; and each signal in the second signal set corresponds to a respective one of one or more transmission beams.

In at least one alternative embodiment, each signal in the first signal set is quasi-colocated with at least one control resource set with respect to a space receiving parameter.

In at least one alternative embodiment, the second event is used to indicate that a number of times that the first event has successively occurred exceeds a first value.

Accordingly, in the embodiment of the disclosure, the terminal detects the signal in the second signal set only when it is determined that the second event occurs, so that power consumption of the terminal may be reduced.

It is to be understood that specific implementation of the method 400 may refer to descriptions about the method 200 and, for simplicity, will not be elaborated herein.

FIG. 6 is a schematic block diagram of a terminal 500 according to an embodiment of the disclosure. As illustrated in FIG. 6, the terminal 500 includes a first processing unit 510 and a second processing unit 520. The first processing unit 510 is configured to report, at a first protocol layer, a first event to a second protocol layer, the first event being used to indicate that quality of a signal in a first signal set is bad enough to satisfy a first condition. The second processing unit 520 is configured to determine, at the second protocol layer, occurrence of a second event based on an occurrence situation of the first event, the second event being used to indicate that link quality corresponding to the signal in the first signal set is bad enough to satisfy a second condition. The first processing unit 510 is further configured to, when the second event has occurred, stop at least one of the following at the first protocol layer: measuring the quality of the signal in the first signal set, determining occurrence of the first event, or reporting the first event to the second protocol layer; or, continue the at least one of the following at the first protocol layer: measuring the quality of the signal in the first signal set, determining the occurrence of the first event, or reporting the first event to the second protocol layer.

In at least one alternative embodiment, the second processing unit 520 is further configured to, when it is determined at the second protocol layer that the second event has occurred, send, at the second protocol layer, first indication information to the first protocol layer, the first indication information being used to indicate that the second event has occurred or instruct to stop the at least one of the following: measuring the quality of the signal in the first signal set, determining the occurrence of the first event, or reporting the first event to the second protocol layer. The first processing unit 510 is configured to, responsive to the first indication information, stop the at least one of the following at the first protocol layer: measuring the quality of the signal in the first signal set, determining the occurrence of the first event, or reporting the first event to the second protocol layer.

In at least one alternative embodiment, the second processing unit 520 is further configured to send, at the second protocol layer, second indication information to the first protocol layer, the second indication information being used to instruct the terminal to perform at least one of the following: measuring a signal in a second signal set, reporting a signal in the second signal set, of which signal quality is good enough to satisfy a third condition, or reporting a corresponding measurement result.

In at least one alternative embodiment, the first processing unit 510 is further configured to, responsive to the second indication information, perform the at least one of the following at the first protocol layer: measuring the signal in the second signal set, reporting the signal in the second signal set, of which the signal quality is good enough to satisfy the third condition, or reporting the corresponding measurement result.

In at least one alternative embodiment, the first processing unit 510 is further configured to, when the first event is continued to be reported to the second protocol layer at the first protocol layer, determine, at the second protocol layer, whether the link quality corresponding to the signal in the first signal set is good enough to satisfy a fourth condition according to a situation of the first event that is continued to be reported.

In at least one alternative embodiment, the second processing unit 520 is further configured to, when it is determined at the second protocol layer that the link quality corresponding to the signal in the first signal set is not good enough to satisfy the fourth condition, continue at least one of the following: executing a link reconfiguration procedure triggered by the second event, or incrementing a timer corresponding to the link reconfiguration procedure.

In at least one alternative embodiment, the second processing unit 520 is further configured to, when it is determined at the second protocol layer that the link quality corresponding to the signal in the first signal set is good enough to satisfy the fourth condition, perform at least one of the following: aborting the link reconfiguration procedure triggered by the second event, or stopping the timer corresponding to the link reconfiguration procedure.

In at least one alternative embodiment, the link reconfiguration procedure includes at least one of: selecting, from the second signal set, a signal of which the signal quality is good enough to satisfy the third condition; sending a first message to a network side, the first message being used to indicate the selected signal; or monitoring a second message sent by the network side responsive to the first message.

In at least one alternative embodiment, the terminal 500 further includes a detection unit 530, configured to, when the second processing unit 520 determines at the second protocol layer that the link quality corresponding to the signal in the first signal set is good enough to satisfy the fourth condition, continue PDCCH detection in a first control resource set, the first control resource set being a resource set for PDCCH detection before the second event occurs.

In at least one alternative embodiment, the fourth condition includes at least one of the following conditions.

A number of times that the first event occurs within each of K time ranges is less than or equal to a first value, the first value being a number greater than or equal to 0.

A number of times that the second event occurs within the each of the K time ranges is less than or equal to a second value, the second value being a number greater than or equal to 0.

A number of times that the second event occurs within the K time ranges is less than or equal to a third value, the third value being a number greater than or equal to 0.

A ratio of the number of times that the first event occurs to a number of times that the first event does not occur within the each of the K time ranges is less than or equal to a fourth value, the fourth value being a number greater than or equal to 0.

A ratio of the number of times that the first event does not occur to the number of times that the first event occurs within the each of the K time ranges is greater than or equal to a fifth value, the fifth value being a number greater than or equal to 0.

In at least one alternative embodiment, the terminal further includes the detection unit 530, configured to perform at least one of: keeping PDCCH detection in the first control resource set until a first moment arrives; or, stopping PDCCH detection in the first control resource set after the first moment, the first control resource set being a resource set for PDCCH detection before the second event occurs.

In at least one alternative embodiment, the first moment is one of:

a moment at which the occurrence of the second event is determined;

a moment at which the first indication information is sent from the second protocol layer to the first protocol layer;

a moment at which a signal is reported from the first protocol layer to the second protocol layer, the signal being one in a second signal set, of which signal quality is good enough to satisfy a third condition;

a moment at which a first message is sent to a network side, the first message being used to indicate at least one selected signal;

a moment at which a second message sent by the network side responsive to the first message is started to be monitored;

a moment at which the second message is received; or, a moment at which configuration information for configuring a third control resource set is received from the network side.

In at least one alternative embodiment, when the first moment is the moment at which the second message is started to be monitored, or the moment at which the second message is received, or the moment at which the configuration information is received, the detection unit 530 is further configured to:

in a case that detection in a first control resource set conflicts with detection in a second control resource set, perform PDCCH detection by preferential use of the second control resource set, the second control resource set being exclusively dedicated to detection of the second message.

In at least one alternative embodiment, the first processing unit 510 is further configured to:

when the first event is continued to be reported to the second protocol layer from the first protocol layer, stop reporting, at the first protocol layer, the first event to the second protocol layer from or after a second moment.

In at least one alternative embodiment, the second moment is one of:

a moment at which a signal is reported from the first protocol layer to the second protocol layer, the signal being one in a second signal set, of which the signal quality is good enough to satisfy a third condition;

a moment at which a first message is sent to a network side, the first message being used to indicate a selected signal;

a moment at which a second message sent by the network side responsive to the first message is started to be monitored;

a moment at which the second message is received; or, a moment at which at least one of first indication information, second indication information, or third indication information sent from the second protocol layer is received at the first protocol layer.

The first indication information is used to indicate that the second event has occurred or instruct the terminal to stop the at least one of the following: measuring the quality of the signal in the first signal set, determining the occurrence of the first event, or reporting the first event to the second protocol layer. The second indication information is used to instruct the terminal to perform at least one of the following: measuring a signal in the second signal set, reporting a signal in the second signal set, of which the signal quality is good enough to satisfy the third condition, or reporting the corresponding measurement result.

In at least one alternative embodiment, each signal in the first signal set corresponds to a respective one of one or more transmission beams; and each signal in the second signal set corresponds to a respective one of one or more transmission beams In at least one alternative embodiment, each signal in the first signal set is quasi-colocated with at least one control resource set with respect to a space receiving parameter.

In at least one alternative embodiment, the first protocol layer is a physical layer, and the second protocol layer is a MAC layer.

In at least one alternative embodiment, the second event is used to indicate that a number of times that the first event has successively occurred exceeds a sixth value.

It is to be understood that the terminal 500 may correspond to the terminal in the method 200 and may implement corresponding operations implemented by the terminal in the method 200. For simplicity, elaborations will be omitted herein.

FIG. 7 is a schematic block diagram of a terminal 600 according to an embodiment of the disclosure. As illustrated in FIG. 7, the terminal 600 includes a measurement unit 610, a determination unit 620 and a detection unit 630.

The measurement unit 610 is configured to measure a signal in a first signal set to determine occurrence of a first event, the first event being used to indicate that quality of the signal in the first signal set is bad enough to satisfy a first condition.

The determination unit 620 is configured to determine occurrence of a second event based on an occurrence situation of the first event.

The detection unit is configured to, when the determination unit 620 determines that the second event has occurred, perform at least one of the following: keeping PDCCH detection in the first control resource set until a first moment arrives, or stopping the PDCCH detection in the first control resource set after the first moment.

The first control resource set is a resource set for PDCCH detection before the second event occurs, and the second event is used to indicate that link quality corresponding to the signal in the first signal set is bad enough to satisfy a second condition.

In at least one alternative embodiment, the first moment is one of a moment at which the occurrence of the second event is determined;

a moment at which a signal is reported from the first protocol layer to a second protocol layer, the signal being one in a second signal set, of which signal quality is good enough to satisfy a third condition;

a moment at which a first message is sent to a network side, the first message being used to indicate at least one selected signal;

a moment at which a second message sent by the network side responsive to the first message is started to be monitored;

a moment at which the second message is received; or, a moment at which configuration information for configuring a third control resource set is received from the network side.

In at least one alternative embodiment, when the first moment is the moment at which the second message is started to be monitored, or the moment at which the second message is received, or the moment at which the configuration information is received, the detection unit is further configured to:

in a case that detection in the first control resource set conflicts with detection in a second control resource set, perform PDCCH detection by preferential use of the second control resource set, the second control resource set being exclusively dedicated to detection of the second message.

In at least one alternative embodiment, each signal in the first signal set corresponds to a respective one of one or more transmission beams, and each signal in the second signal set corresponds to a respective one of one or more transmission beams.

In at least one alternative embodiment, each signal in the first signal set is quasi-colocated with at least one control resource set with respect to a space receiving parameter.

In at least one alternative embodiment, the second event is used to indicate that a number of times that the first event has successively occurred exceeds a first value.

It is to be understood that the terminal 600 may correspond to the terminal in the method 300 and may implement corresponding operations implemented by the terminal in the method 300. For simplicity, elaborations will be omitted herein.

Figure 8:
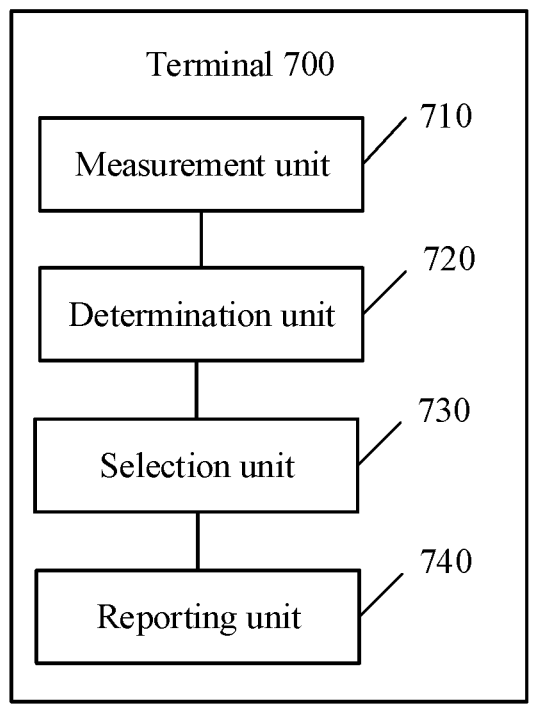
FIG. 8 is a schematic block diagram of a terminal according to an embodiment of the disclosure.

FIG. 8 is a schematic block diagram of a terminal 700 according to an embodiment of the disclosure. As illustrated in FIG. 8, the terminal 700 includes a measurement unit 710, a determination unit 720, a selection unit 730 and a reporting unit 740.

The measurement unit 710 is configured to measure a signal in a first signal set to determine occurrence of a first event, the first event being used to indicate that quality of the signal in the first signal set is bad enough to satisfy a first condition.

The determination unit 720 is configured to determine occurrence of a second event based on an occurrence situation of the first event.

The measurement unit 710 is further configured to, when the determination unit determines that the second event has occurred, measure a signal in a second signal set, the second event being used to indicate that link quality corresponding to the signal in the first signal set is bad enough to satisfy a second condition.

The selection unit 730 is configured to select, from the second signal set, at least one signal of which signal quality is good enough to satisfy a third condition.

The reporting unit 740 is configured to report the at least one signal to a network device.

In at least one alternative embodiment, each signal in the first signal set corresponds to a respective one of one or more transmission beams; and each signal in the second signal set corresponds to a respective one of one or more transmission beams.

In at least one alternative embodiment, each signal in the first signal set is quasi-colocated with at least one control resource set with respect to a space receiving parameter.

In at least one alternative embodiment, the second event is used to indicate that a number of times that the first event has successively occurred exceeds a first value.

It is to be understood that the terminal 700 may correspond to the terminal in the method 400 and may implement corresponding operations implemented by the terminal in the method 400. For simplicity, elaborations will be omitted herein.

Figure 9:
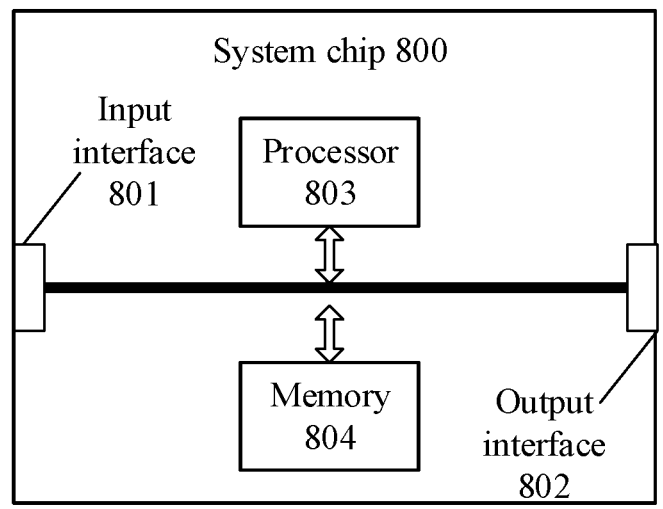
FIG. 9 is a schematic block diagram of a system chip according to an embodiment of the disclosure.

FIG. 9 is a schematic structure diagram of a system chip 800 according to an embodiment of the disclosure. The system chip 800 of FIG. 9 includes an input interface 801, output interface 802, processor 803 and memory 804 which may be connected through an internal communication connecting line. The processor 803 is configured to execute a code in the memory 804.

In at least one alternative embodiment, when the code is executed, the processor 803 implements the method executed by the network device in the method embodiment. For simplicity, elaborations are omitted herein.

In at least one alternative embodiment, when the code is executed, the processor 803 implements the method executed by the terminal device in the method embodiment. For simplicity, elaborations are omitted herein.

Figure 10:
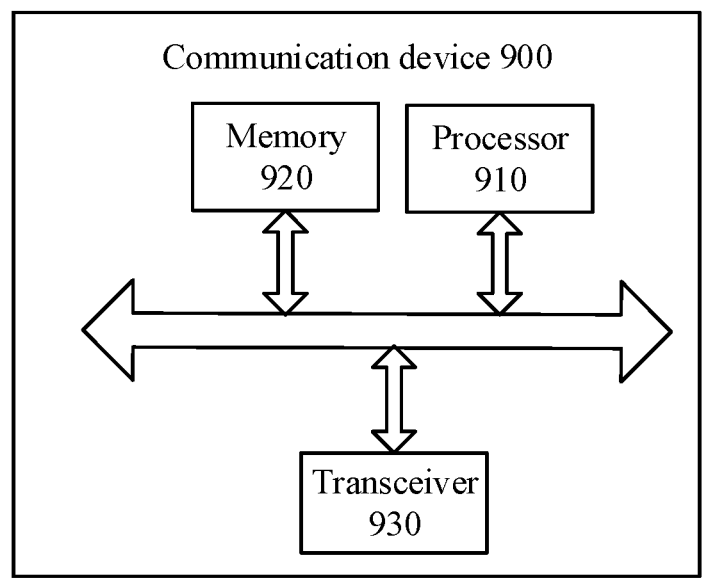
FIG. 10 is a schematic block diagram of a communication device according to an embodiment of the disclosure.

FIG. 10 is a schematic block diagram of a communication device 900 according to an embodiment of the disclosure. As illustrated in FIG. 10, the communication device 900 includes a processor 910 and a memory 920. Herein, the memory 920 may store a program code, and the processor 910 may execute the program code stored in the memory 920.

In at least one alternative embodiment, as illustrated in FIG. 10, the communication device 900 may include a transceiver 930, and the processor 910 may control the transceiver 930 for external communication.

In at least one alternative embodiment, the processor 910 may call the program code stored in the memory 920 to execute corresponding operations of the network device in the method embodiment. For similarity, elaborations will be omitted herein.

In at least one alternative embodiment, the processor 910 may call the program code stored in the memory 920 to execute corresponding operations of the terminal device in the method embodiment. For similarity, elaborations will be omitted herein.

It is to be understood that the processor in the embodiment of the disclosure may be an integrated circuit chip and has a signal processing capability. In an implementation process, each operation of the method embodiment may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the related art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
   reporting, by a terminal, at a first protocol layer, a first event to a second protocol layer, wherein the first event is used to indicate that quality of a signal in a first signal set is bad enough to satisfy a first condition;
   determining, by the terminal, at the second protocol layer, occurrence of a second event when a number of times that the first event has successively occurred exceeds a threshold; and
   sending, by the terminal, a first message to a network device, wherein the first message is used to indicate a signal in the second signal set, of which signal quality is good enough to satisfy a third condition;
wherein occurrence of the first event comprises occurrence of beam failure instance, the occurrence of the second event comprises occurrence of beam failure, and the second event is used to indicate that link quality corresponding to the signal in the first signal set is bad enough to satisfy a second condition.

2. The method of claim 1, further comprising:
after determining, by the terminal, at the second protocol layer, the occurrence of the second event,
starting, by the terminal, a timer; wherein the timer is used for the terminal to execute a link reconfiguration procedure during a duration of the timer.

3. The method of claim 1, wherein the quality of the signal in the first signal set is bad enough to satisfy the first condition comprises:
the quality of the signal in the first signal set is worse than a threshold.

4. The method of claim 1, further comprising:
sending, by the terminal, second indication information to the first protocol layer from the second protocol layer, wherein the second indication information is used to indicate at least one of the following:
reporting the signal in the second signal set, of which the signal quality is good enough to satisfy the third condition; or,
reporting a measurement result about signals in the second signal set.

5. The method of claim 3, further comprising:
responsive to the second indication information, performing, by the terminal, the at least one of the following at the first protocol layer:
reporting the signal in the second signal set, of which the signal quality is good enough to satisfy the third condition; or,
reporting the measurement result about the signals in the second signal set.

6. The method of claim 1, wherein each signal in the first signal set corresponds to a respective one of one or more transmission beams; and each signal in the second signal set corresponds to a respective one of one or more transmission beams.

7. The method of claim 1, wherein each signal in the first signal set is quasi-colocated with at least one control resource set with respect to a space receiving parameter.

8. The method of claim 1, wherein the first protocol layer is a physical layer, and the second protocol layer is a Media Access Control (MAC) layer.

9. A terminal, comprising:
a processor; and
a memory storing instructions executable by the processor,
wherein the processor is configured to:
report, through a transceiver, at a first protocol layer, a first event to a second protocol layer, wherein the first event is used to indicate that quality of a signal in a first signal set is bad enough to satisfy a first condition;
determine, at the second protocol layer, occurrence of a second event when a number of times that the first event has successively occurred exceeds a threshold; and
send, through the transceiver, a first message to a network device, wherein the first message is used to indicate a signal in the second signal set, of which signal quality is good enough to satisfy a third condition;
wherein occurrence of the first event comprises occurrence of beam failure instance, the occurrence of the second event comprises occurrence of beam failure, and the second event is used to indicate that link quality corresponding to the signal in the first signal set is bad enough to satisfy a second condition.

10. The terminal of claim 9, wherein the processor is further configured to:
start a timer after determining the occurrence of the second event at the second protocol layer; wherein the timer is used for the terminal to execute a link reconfiguration procedure during a duration of the timer.

11. The terminal of claim 9, wherein the quality of the signal in the first signal set is bad enough to satisfy the first condition comprises:
the quality of the signal in the first signal set is worse than a threshold.

12. The terminal of claim 9, wherein the processor is further configured to:
send, through the transceiver, at the second protocol layer, second indication information to the first protocol layer, wherein the second indication information is used to indicate at least one of the following:
reporting the signal in the second signal set, of which the signal quality is good enough to satisfy the third condition; or,
reporting a measurement result about signals in the second signal set.

13. The terminal of claim 12, wherein the processor is further configured to:
responsive to the second indication information, perform the at least one of the following at the first protocol layer:
reporting the signal in the second signal set, of which the signal quality is good enough to satisfy the third condition; or
reporting the measurement result about the signals in the second signal set.

14. The terminal of claim 9, wherein each signal in the first signal set corresponds to a respective one of one or more transmission beams; and each signal in the second signal set corresponds to a respective one of one or more transmission beams.

15. The terminal of claim 9, wherein each signal in the first signal set is quasi-colocated with at least one control resource set with respect to a space receiving parameter.

16. The terminal of claim 9, wherein the first protocol layer is a physical layer, and the second protocol layer is a Media Access Control (MAC) layer.

17. A non-transitory computer-readable storage medium having stored therein instructions that, when executed by a processor, cause the processor to:
report, through a transceiver, at a first protocol layer, a first event to a second protocol layer, wherein the first event is used to indicate that quality of a signal in a first signal set is bad enough to satisfy a first condition;
determine at the second protocol layer, occurrence of a second event when a number of times that the first event has successively occurred exceeds a threshold; and
send, through the transceiver, a first message to a network device, wherein the first message is used to indicate a signal in the second signal set, of which signal quality is good enough to satisfy a third condition;
wherein occurrence of the first event comprises occurrence of beam failure instance, the occurrence of the second event comprises occurrence of beam failure, and the second event is used to indicate that link quality corresponding to the signal in the first signal set is bad enough to satisfy a second condition.

18. The non-transitory computer-readable storage medium of claim 17, wherein the instructions that, when executed by the processor, cause the processor further to:
start a timer after determining the occurrence of the second event at the second protocol layer; wherein the timer is used for the terminal to execute a link reconfiguration procedure during a duration of the timer.

19. The non-transitory computer-readable storage medium of claim 17, wherein the quality of the signal in the first signal set is bad enough to satisfy the first condition comprises:
the quality of the signal in the first signal set is worse than a threshold.

20. The non-transitory computer-readable storage medium of claim 17, wherein the instructions that, when executed by the processor, cause the processor further to:
send, through the transceiver, at the second protocol layer, second indication information to the first protocol layer, wherein the second indication information is used to indicate at least one of the following:
reporting the signal in the second signal set, of which the signal quality is good enough to satisfy the third condition; or,
reporting a measurement result about signals in the second signal set.

* * * * *